Sept. 3, 1929.  S. L. RICHMOND  1,726,767
METHOD AND MEANS FOR GROWING PLANTS IN TROPICAL CLIMATES
Filed June 15, 1927  2 Sheets-Sheet 1
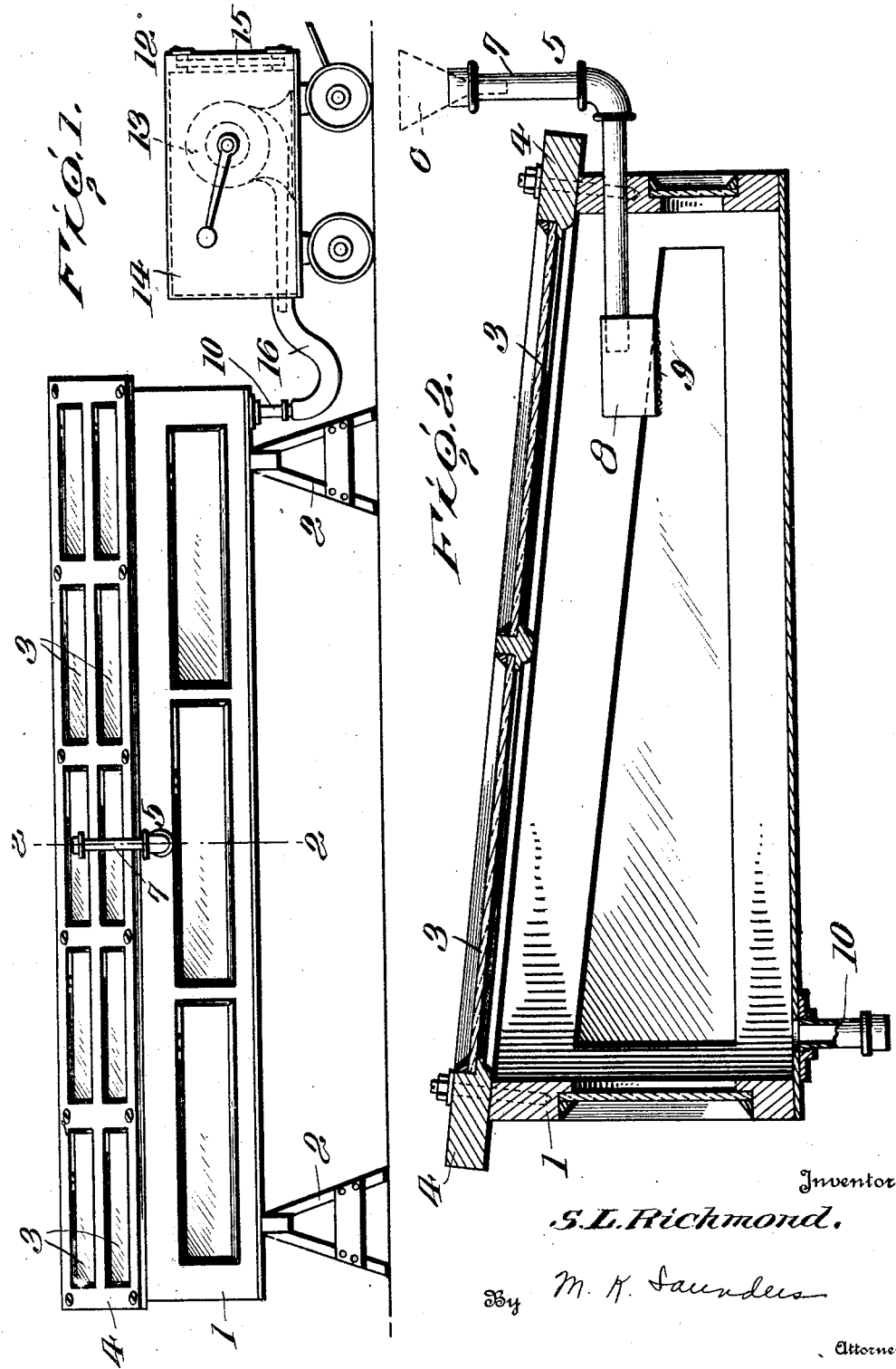
Inventor
S. L. Richmond.
By M. K. Saunders
Attorney

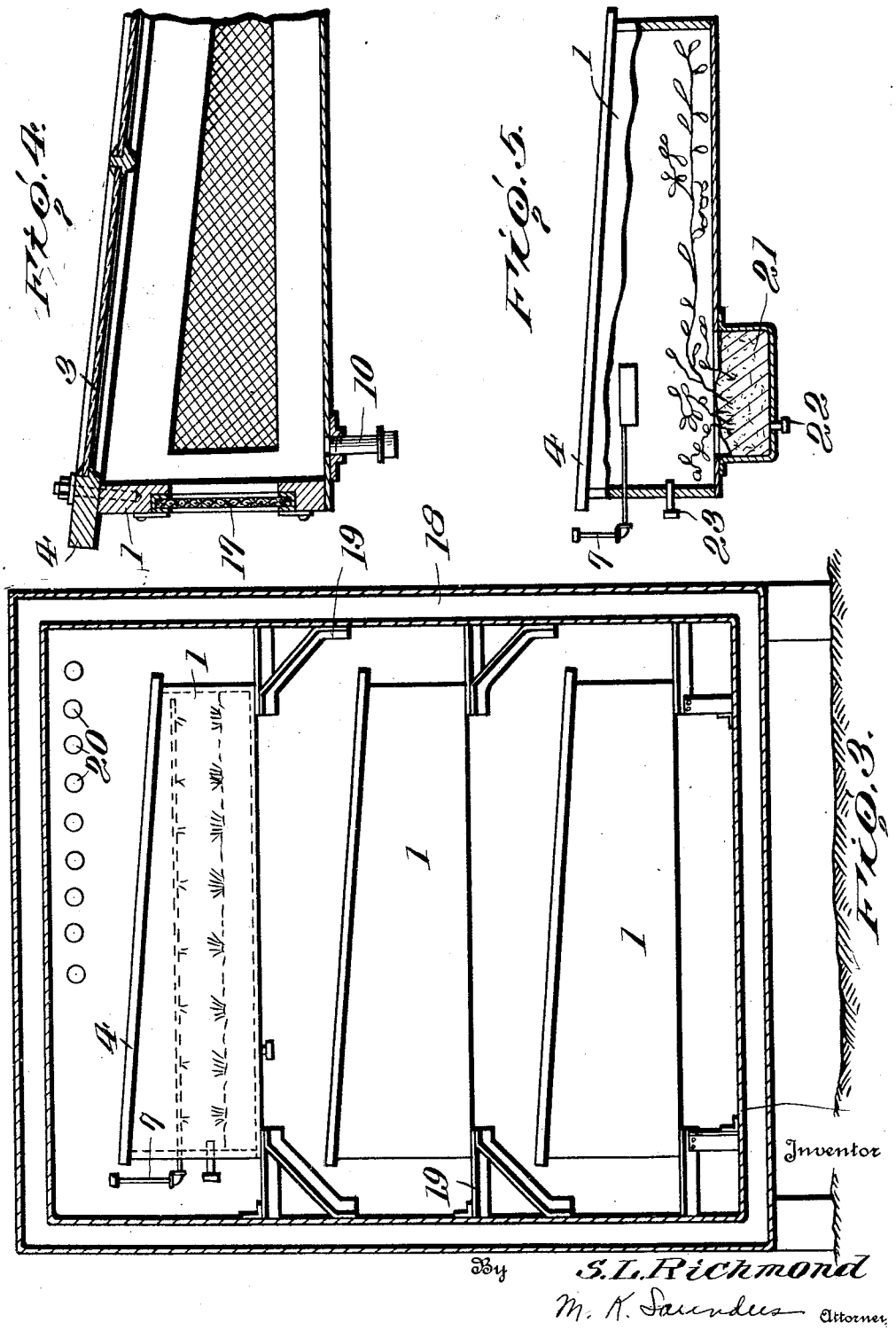

Patented Sept. 3, 1929.

1,726,767

UNITED STATES PATENT OFFICE.

SAMUEL L. RICHMOND, OF BALBOA, CANAL ZONE, PANAMA.

METHOD AND MEANS FOR GROWING PLANTS IN TROPICAL CLIMATES.

Application filed June 15, 1927. Serial No. 199,004.

This invention relates to a method and apparatus for growing plants in tropical climates and the object of my invention is to increase the variety and improve the quality of plants which can be raised in hot, humid, insect infested tropical climates.

Another object of my invention is to provide a method and means for raising temperate climate plants and other delicate plants in the tropics.

In certain tropical climates, as for example that of the Canal Zone, fruits, vegetables and flowers, such as are produced in temperate climates cannot be successfully raised for the reason that they are attacked by the many parasites which infest the country. Worms attack the roots; insects sting the plants; plant lice feed on the plants, and bugs eat the leaves.

The ordinary greenhouse, and the protection it affords, is not sufficient to overcome these pests, since even a few bugs entering the greenhouse will multiply so rapidly that the crop will be destroyed in a short time. These houses are not provided with positive ventilation nor with cooling other than shading.

The preventatives and precautions employed in temperate climates are too mild in their action to prove of any practical advantage.

If strong poisonous sprays are used they will have a burning effect upon the plant, and moreover if such poison is sprayed on fruits or vegetable plants, a thin film of poison will remain on the edible portion of the plant.

In order to prevent the destruction of such growing plants and thus increase the variety and perfect the quality of the flowers, vegetables and fruits which can be raised in a hot, humid climate, I employ the apparatus shown in the accompanying drawings, in which:—

Figure 1 is an elevation of my improved agricultural apparatus;

Figure 2 is a vertical section on the line 2—2 of Figure 1;

Figure 3 is a schematic view of another form of my invention;

Figure 4 is a section through a modified form of receptacle embodying my invention, partly broken away; and Figure 5 is a view of another modified form of a receptacle comprising one element of my invention.

On the drawings, in which like reference characters indicate like parts on all the figures thereof, 1 indicates a closed container of suitable proportions and preferably mounted on supports 2. This container is preferably air tight, but may be merely sufficiently tight to be insect proof. The top of the receptacle is provided with windows 3 for admitting sunlight through the cover 4 of the receptacle. 5 indicates the means for introducing sterilized, fertilized and filtered water into the receptable for watering the plants and comprises a funnel 6, a pipe 7 and a sprinkler 8 having wire gauze 9 over the outlet thereof.

This watering apparatus is preferably adjustable so that the sprinkler may be placed in any desired position to spray the plants effectively. A drain 10 is also provided at the bottom of the receptacle for drawing off any surplus water. An air tight cap may be placed over the drain and other openings when these parts are not functioning.

12 indicates the apparatus for introducing pure air into the receptable for supplying the necessary elements, such as oxygen and nitrogen, for the growing plants. This apparatus preferably comprises a portable blower 13 enclosed in a recptacle 14 into which air is admitted through a filter 15 which is of suitable type to remove minute, invisible bugs, or insects or eggs. The blower is placed in communication with the interior of the receptacle 1 by means of a hose 16, which may be attached to the drain 10, or any other suitable pipe connection provided on the receptacle.

As an alternative means for introducing pure, fresh air into the receptacle, the receptacle may be provided with openings 17 in the walls thereof, which openings will be provided with air filtering material so that a continuous circulation of air will take place through the receptacle. The blower 13 and the connections thereto may then be dispensed with.

The windows 3 may also be provided with any suitable substance for modifying the sun's rays.

In Figure 3, I have shown an apparatus in which plants such as strawberries requiring a low temperature during a part of their growing period may be raised. In this figure, an insulated refrigerating box 18 is provided with a series of supports 19 on which may be placed the removable receptacles 1.

A refrigerating unit 20 is provided in the upper portion of the refrigerating box and the circulation of the air will take place as indicated by the arrows.

In Figure 5 I have shown the receptacle 1 of such form that it is pecularily adapted for the raising of vine plants. In this form of receptacle the earth is contained in a chamber 21, the drain 22 leading out therefrom, thus necessitating a separate opening 23 for the air intake.

The method of raising plants by means of my apparatus consists of sterilizing the receptacle by means of a blow torch or any other suitable apparatus. Sterilized, fertile soil is then placed in the receptacle to the proper depth. The sterilization of the soil is preferably accomplished by roasting to a temperature of approximately 300 degrees Fahrenheit. The seeds are then planted and the receptacle closed or sealed up. The fertilized, sterilized and filtered water is then introduced through the sprinkling apparatus. During each day, if the receptacle is air tight, the blower is attached to blow out the steamy or impure air in the receptacle and to supply fresh air thereto, or to cool the plants in the sunshine.

While I have shown the preferred method and apparatus for carrying out my invention, it is to be understood that I do not desire to be limited thereto except within the scope of the appended claims.

Having thus described my invention, what I claim as new and desire to secure by Letters Patent of the United States is as follows:

1. In an apparatus for growing plants, an entire closed air tight receptacle, sterilized soil therein, means for introducing sterilized moisture into the receptacle, means for introducing filtered air into the receptacle, and removing the exhausted air from the receptacle, and means for draining the receptacle.

2. In an apparatus for growing plants, a substantially airtight entirely enclosed receptacle, sterilized soil in said receptacle, a sprinkler for introducing sterilized and filtered water into the receptacle, a blower for removing the exhausted air from the receptacle, and introducing the filtered air in place thereof.

3. A process for growing plants, comprising sterilizing a substantially airtight container containing sterilized soil and plant life, sprinkling the plants with sterilized water, draining the receptacle and introducing filtered air into the container while the container is out of communication with the outer air.

4. A process for growing plants, comprising sterilizing a substantially airtight container, placing sterilized soil in the container, planting the plants in the soil, sprinkling the plants with sterilized water, draining the receptacle, blowing filtered air into the container and regulating the temperature of the container.

5. An apparatus for growing plants, comprising a substantially air tight receptacle, having plants therein, means for introducing moisture therein, a drain for removing the superfluous moisture, means for cooling the air therein, said last named means comprising a blower communicating with the interior of the receptacle.

In testimony whereof I hereby affix my signature.

SAMUEL L. RICHMOND.